Nov. 25, 1924.　　　　　　　　　　　　　　1,516,517
H. BOLTSHAUSER
STEAM TURBINE DRIVEN LOCOMOTIVE
Filed Sept. 6, 1922　　　2 Sheets-Sheet 1
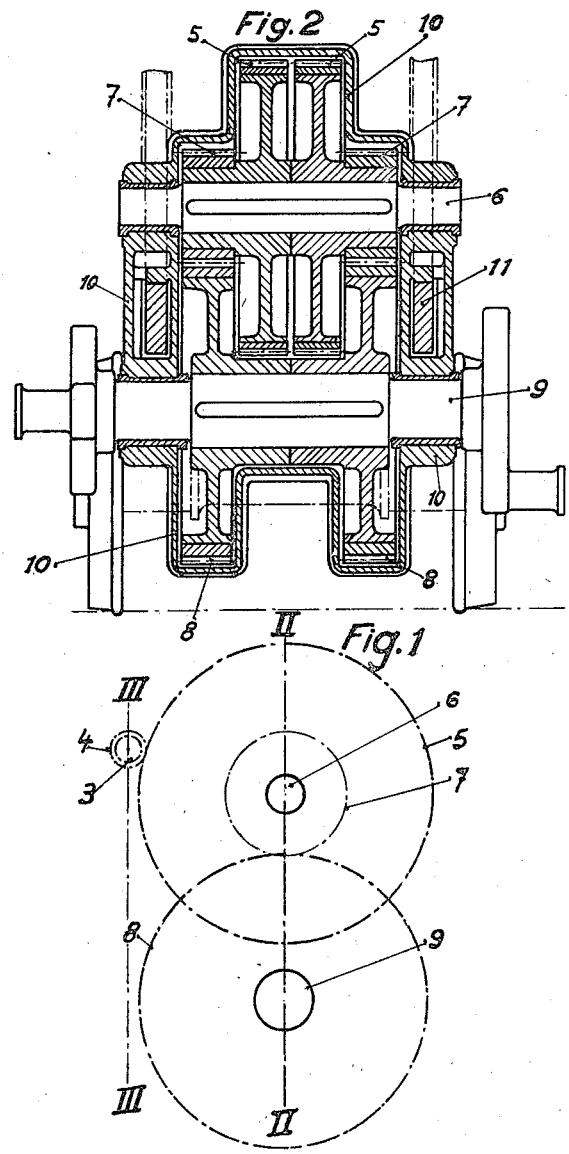

Nov. 25, 1924.

H. BOLTSHAUSER

STEAM TURBINE DRIVEN LOCOMOTIVE

Filed Sept. 6, 1922

Inventor
Heinrich Boltshauser

Patented Nov. 25, 1924.

1,516,517

UNITED STATES PATENT OFFICE.

HEINRICH BOLTSHAUSER, OF ZURICH, SWITZERLAND.

STEAM-TURBINE-DRIVEN LOCOMOTIVE.

Application filed September 6, 1922. Serial No. 586,551.

*To all whom it may concern:*

Be it known that I, HEINRICH BOLTSHAUSER, a citizen of the Republic of Switzerland, residing at Zurich, Switzerland, have invented certain new and useful Improvements in Steam-Turbine-Driven Locomotives, of which the following is a specification, reference being had therein to the accompanying drawing.

With locomotives driven by steam turbines through the interposition of toothed transmission gearings a proper setting or mounting of the toothed gearing is of great importance. When the mounting is bad or when the bearings are subjected to great stresses, the gear wheels of the transmission gearing produce much noise and are subjected to great wear and tear. Particularly when large powers have to be transmitted from the turbine to the driving axles, a rigid mounting of the single shafts of the transmission gearing is an indispensable condition.

The object of the present invention is to provide a steam locomotive fitted with a turbine for ahead running and a turbine for astern running of the locomotive, i. e. an ahead and an astern turbine, which locomotive responds to the above stated requirements. To this end the toothed transmission gearing, by means of which the turbines actuate the driving axles, is arranged between the ahead and the astern turbine within a casing or frame serving to connect these turbines and to support said turbines, the casing forming a unit or set being fitted to the locomotive frame.

A constructional example of the invention is shown in the accompanying drawings, in which:

Fig. 1 illustrates diagrammatically in a side-view the arrangement of the toothed transmission gearing, the individual gear wheels being indicated by their pitch circles.

Fig. 2 is a section along line II—II of Fig. 1 and of Fig. 4 respectively.

Figure 3:
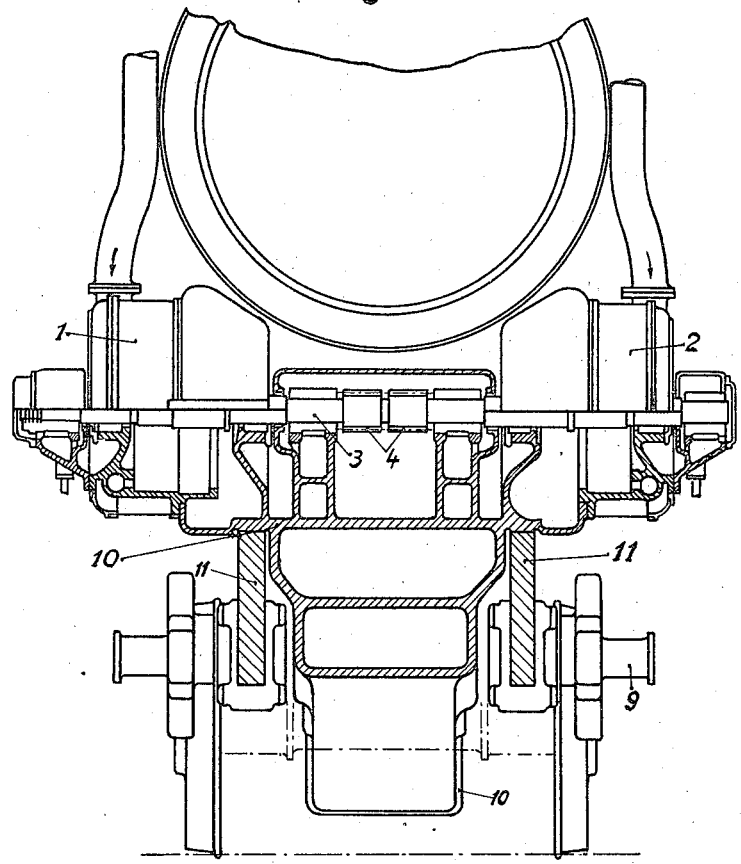
Fig. 3 is a section along line III—III of Fig. 1 and of Fig. 4 respectively, showing at the same time several parts of the locomotive in front view.
Figure 4:
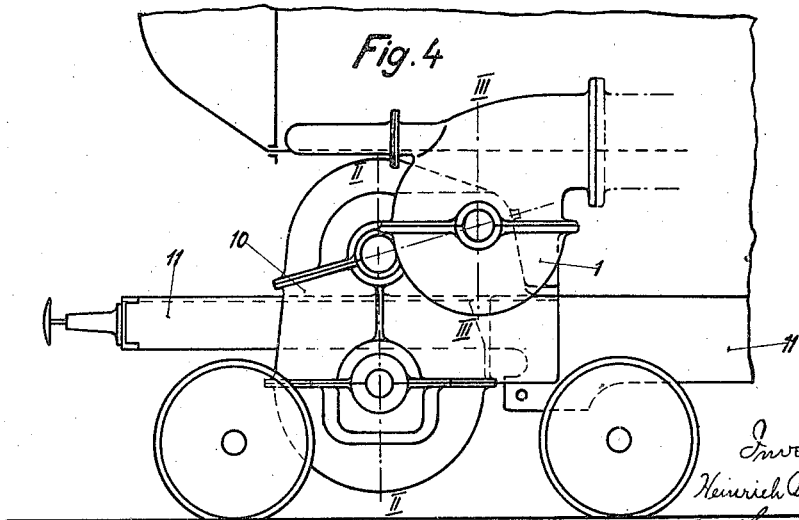
Fig. 4 shows in side view part of the steam turbine driven locomotive, Fig. 4 being drawn to a slightly different scale to that of Figs. 2 and 3, the distances between the various axles being chosen somewhat different to those shown in Figs. 2 and 3 for the sake of clearness.

In the drawing 1 denotes an ahead turbine and 2 an astern turbine actuating a shaft 3 common to both. To the shaft 3 two pinions 4 (Fig. 3) are fixed which cooperate with two gear wheels 5 (Fig. 2). The latter are keyed to a shaft 6. To this shaft 6 there are further fixed two gear wheels 7 with which two gear wheels 8 cooperate, the gear wheels 8 being fixed to a driving axle 9, i. e. a lay shaft. 11 denotes the locomotive frame comprising two longitudinal girders. The toothed wheels 4, 5, 7, 8 are arranged between the girders of the frame 11. The two turbines 1 and 2 are connected to each other by means of a casing or frame 10 which serves at the same time for supporting the turbines. The shaft 3, the shaft 6, as well as the lay shaft 9 are mounted in this casing 10. The gear wheels 4, 5, 7 and 8 are arranged between the two turbines and within the casing 10 between the places where the shafts are supported in this casing 10. By this arrangement the shafts of the toothed transmission gearing are supported in such a manner that no forces are present which act in a one-sided manner as is, for instance, the case where some of the gear wheels are arranged within and other gearing without the bearings for the shafts of the toothed transmission gearing. In the embodiment shown, the casing 10 provided with a double guide is carried by the longitudinal girders of the locomotive frame 11, the connection between the casing 10 and the locomotive frame 11 being such that the casing together with the reduction gearing and the turbines pushed onto the longitudinal girders may be readily fitted as an exchangeable unit to the frame 11. When desired, the casing 10 may, however, also be connected to the frame of the locomotive in a permanent manner.

I claim:

1. In a steam turbine driven locomotive, a turbine for the ahead running of the locomotive, a turbine for the astern running of the locomotive, a driving axle, a transmission gearing common to both turbines, arranged between said two turbines and adapted to transmit the driving power from the turbines to said driving axle, a locomotive frame, and a casing enclosing said transmission gearing and serving to connect the two turbines together and at the same time to support the latter, said casing being fitted in an exchangeable manner to said locomotive frame.

2. In a steam turbine driven locomotive, a turbine for the ahead running of the locomotive, a turbine for the astern running of the locomotive, a lay shaft, a double reduction gearing common to both turbines, arranged between said two turbines and adapted to transmit the driving power from the turbines to said lay shaft, a locomotive frame, a casing enclosing said reduction gearing and serving to connect said two turbines together and at the same time to support the latter, said casing being fitted in an exchangeable manner to said locomotive frame, said lay shaft, a countershaft of said double reduction gearing and the shaft of the turbines being journalled in said casing.

3. In a steam turbine driven locomotive, a frame comprising two longitudinal girders, a turbine for the ahead running of the locomotive, a turbine for the astern running of the locomotive, a driving axle, a transmission gearing arranged between said longitudinal girders and adapted to transmit the driving power from the turbines to said driving axle, and a casing enclosing said transmission gearing and connecting the two turbines together and serving at the same time to support the latter, said casing being fitted to the locomotive frame.

4. In a steam turbine driven locomotive, a frame comprising two longitudinal girders, a turbine for the ahead running of the locomotive, a turbine for the astern running of the locomotive, a driving axle, a double toothed wheel reduction gearing adapted to transmit the driving power from the turbines to said driving axle, the toothed wheels of the reduction gearing being arranged between the longitudinal girders of the locomotive frame, and a casing enclosing said transmission gearing and connecting the two turbines together and serving at the same time to support the latter, said casing provided with a double guide being pushed in a removable manner onto the longitudinal girders of the locomotive frame.

5. In a steam turbine driven locomotive, the combination with a casing arranged for mounting on the frame of the locomotive, a turbine mounted in said casing, and a driving or lay shaft, of transmission reduction gearing between the turbine and lay shaft said gearing mounted in the casing and between the side members of the locomotive frame.

6. In a steam turbine driven locomotive, the combination with the locomotive frame; of a casing removably mounted on said frame having two turbines spaced apart, a locomotive driving axle and gearing symmetrically arranged between the turbines to drive said axle, whereby said turbines and driving axle may be removed and exchanged as a unit.

7. In a steam turbine driven locomotive, the combination with the locomotive; of a casing removably mounted on said frame, said casing having two turbines spaced apart, a symmetrically arranged gearing also mounted in said frame between the turbines arranged to transmit power from either of said turbines to a driving axle.

8. In a steam turbine driven locomotive, the combination with a casing arranged for mounting on the frame of the locomotive, a turbine for ahead-running of the locomotive, and a turbine for astern running, both turbines being mounted in said casing, and a lay shaft journaled in the casing; of transmission reduction gearing between said turbines and lay shaft, said gearing mounted in the casing and between the side members of the locomotive frame.

In testimony whereof I affix my signature.

HEINRICH BOLTSHAUSER.

Witnesses:
F. HEIM,
AUGUST BRUGG.